United States Patent

Kortz et al.

Patent Number: 5,848,079
Date of Patent: Dec. 8, 1998

[54] LASER WITH FREQUENCY MULTIPLICATION

[75] Inventors: Hans-Peter Kortz, Pansdorf; Wolf Seelert, Lübeck, both of Germany

[73] Assignee: Adlas Lasertechnik GmbH & Co. KG, Lübeck, Germany

[21] Appl. No.: 686,025

[22] Filed: Jul. 25, 1996

[30] Foreign Application Priority Data

Jul. 26, 1995 [DE] Germany .................. 195 27 337.0

[51] Int. Cl.⁶ ...................................................... H01S 3/10
[52] U.S. Cl. ............................................................ 372/22
[58] Field of Search ................................ 372/22, 21

[56] References Cited

U.S. PATENT DOCUMENTS 5,047,688  9/1991  Bosenberg ............................ 372/22
5,144,630  9/1992  Lin ....................................... 372/22
5,247,389  9/1993  Beausoleil ............................ 372/21

*Primary Examiner*—Rodney Bovernick
*Assistant Examiner*—Robert E. Wise
*Attorney, Agent, or Firm*—Bacon & Thomas, PLLC

[57] ABSTRACT

In order to produce higher harmonics more efficiently in a laser having a first optically nonlinear crystal acting as a frequency doubler, and at least one further optically nonlinear crystal acting as a frequency multiplier disposed behind the first nonlinear crystal in the direction of propagation of laser radiation produced by the laser, the first to second-to-last optically nonlinear crystals are selected to each have a walk-off angle in the range of 0.1° to 6°, and all of the optically nonlinear crystals are disposed relative to one another in such a way that the plane of the principal section of one crystal contains a direction of small angular acceptance with respect to phase matching of a following crystal.

6 Claims, 2 Drawing Sheets

(Physical foundations)

LASER WITH FREQUENCY MULTIPLICATION

BACKGROUND OF THE INVENTION

1. Field of the Invention

This invention relates to a laser having a first optically nonlinear crystal acting as a frequency doubler and at least one further optically nonlinear crystal acting as a frequency multiplier disposed therebehind in the direction of propagation of the laser radiation produced by the laser.

2. Description of Related Art

For frequency multiplication of laser light one uses so-called optically nonlinear crystals, i.e. crystals in which nonlinear optical effects are especially pronounced. If a light wave with the frequency f(1) (fundamental) is irradiated in such a crystal this results in an optically nonlinear fraction of the polarization which oscillates at twice the frequency f(2)=2 f(1). At this frequency a light wave, the second harmonic, is radiated. To obtain maximum intensity in the direction of the irradiated wave, the fundamental and the second harmonic must remain in phase when passing through the crystal. For this phase matching the refractive indices n(1), n(2) of the two waves in the crystal must be equal, which can be obtained with the help of double refraction.

For frequency multiplication one uses two types of crystals which differ in the manner of phase matching: type I crystals and type II crystals.

In an optically uniaxial crystal the refractive index n(o) for the ordinary ray has a different value from the refractive index n(e) for the extraordinary ray. An ordinary ray refers to light which is polarized perpendicular to the plane of principal section, while the extraordinary ray is polarized parallel to the plane of principal section. The plane of principal section of the crystal is defined by the direction of incidence of the light ray and the optical axis of the crystal.

The fundamental and the second harmonic are polarized perpendicular to each other. If the polarizing direction of the fundamental is placed e.g. perpendicular to the principal section it runs through the crystal as an ordinary ray and the second harmonic is the extraordinary ray. The refractive index n(1,o) for the fundamental has the same value for all directions of irradiation into the crystal, whereas the refractive index n(2,e) for the second harmonic is dependent on the angle of arrival. If one plots the values of the refractive indices for all angles of arrival in a coordinate system x, y, z, in which the z-axis coincides with the optical axis of the crystal, one obtains a spherical surface for the ordinary ray and the surface of an ellipsoid of revolution for the extraordinary ray, symmetric with respect to the origin of ordinates. If the values of n(1,o) and n(2,e) are suitable the two surfaces intersect in two circular lines. On these circular lines the two refractive indices are equal, there is phase matching.

FIG. 1 shows a section through the figure just described. For n(1,o) one now obtains a circle, for n(2,e) an ellipse. Line L represents a light ray for which phase matching holds. It runs at angle θ to the optical axis of the crystal. If the course of the ray deviates by a small angular amount in the plane of projection, this results in a relatively great deviation of the refractive indices n(1,o) and n(2,e); the phase matching is no longer optimal. If the course of the ray deviates by the same angular amount perpendicular to the plane of projection, this results in a very much smaller deviation of the refractive indices (in this case the ray follows approximately the circular intersection of sphere and ellipsoid on which phase matching holds).

One refers to the angle range in which good phase matching is still given as the angular acceptance of the crystal. The direction in which an angular deviation leads to great deviation of the refractive indices is the direction of the crystal with small angular acceptance. Accordingly the direction perpendicular thereto is the direction with great angular acceptance. For optimal phase matching the divergence angle of a light ray irradiated into the crystal must be smaller than the angular acceptance.

SUMMARY OF THE INVENTION

If a light ray is sent into a crystal as a primary ray, the frequency-multiplied ray drifts off the course of the primary ray increasingly laterally in the plane of principal section on its way through the crystal. This process, referred to as the "walk-off effect", varies in strength depending on the crystal material. It is quantified by a walk-off angle, i.e. the angle between the primary ray and the frequency-multiplied ray. The walk-off effect also causes the cross section of the frequency-multiplied ray to be deformed elliptically when emerging from the crystal, the large semiaxis of the ellipse being in the plane of principal section of the crystal.

The rays of the fundamental and the second harmonic emerging from an optically nonlinear crystal can be guided into a second optically nonlinear crystal in which the triple frequency of the fundamental is additionally produced by mixture for example. In the interest of high efficiency of frequency multiplication the ray cross sections of the fundamental and the second harmonic must overlap as completely as possible in the second crystal, since only in the overlap area can mixture of the waves take place. For physical reasons, however, the ray of the fundamental has a diameter greater by a factor of 1.414 than that of the second harmonic. If one also wants to produce the quadruple frequency of the fundamental by mixing the base frequency and the third harmonic in a further crystal, the even greater difference in the diameters of the rays to be mixed leads to a poor overlap and thus low efficiency.

A laser of the stated type has been described e.g. in the publication "Intracavity Fourth Harmonic Generation Using Three Pieces of LBO in a Nd:YAG Laser" by R. Wu, J. D. Myers and S. J. Hamlin in OSA Proceedings on Advanced Solid-State Lasers, 1994, Vol. 20, Tso Yee Fan and Bruce H. T. Chai (eds.). However no measures are taken for improving the ray overlap or phase matching.

The problem of the invention is to improve a laser according to the preamble of the main claim with respect to the efficiency of producing higher harmonics.

The improvement is obtained by the fact that the first to second last optically nonlinear crystals each have a walk-off angle in the range of 0.1° to 6° and the optically nonlinear crystals are disposed relative to one other in such a way that the plane of principal section of one crystal contains the direction with small angular acceptance with respect to phase matching of the following crystal.

The walk-off effect of an optically nonlinear crystal is exploited advantageously according to the invention to improve the overlap of the ray cross sections of the primary and frequency-multiplied rays during subsequent mixture in a further crystal. The cross section of the frequency-multiplied ray widened by the walk-off effect in the direction of principal section of the first crystal has a greater overlap surface with the primary ray than a ray which would have retained a circular cross section without a walk-off effect.

The overlap can be improved even further by controlling the influence of the walk-off effect by the particular lengths of the first to second last crystals in such a way that the overlap is optimal in the following crystal. Optimal overlap exists when the large semiaxis of the cross-sectional area of the frequency-multiplied ray which is to be mixed with the primary ray approximately matches the diameter of the cross section of the primary ray in the crystal. Necessary length Lk of the particular crystal depends on the size of walk-off angle φ and the difference between diameter Dp of the primary ray and diameter Df of the frequency-multiplied ray to be superimposed with this primary ray which it would have without a walk-off effect. Length Lk is calculated approximatively by the following formula:

$$Lk \approx (Dp-Df)/\tan \phi$$

For the formula to yield a length of the crystal which can also meet the other optical and mechanical requirements, the walk-off angle must be in a range of approx. 0.1° to approx. 6°.

A ray with an elliptical cross section has a smaller divergence in the direction of its large semiaxis than in the direction of its small semiaxis.

One can obtain further optimization of the efficiency for producing higher harmonics by orienting the elliptical ray with its direction of small divergence parallel to the direction with small angular acceptance with respect to phase matching of the following crystal. One obtains the improvement by avoiding as far as possible a worsening of phase matching by excessive ray divergence.

If the polarizing directions of the rays are not located in the direction required by the following crystal at the selected orientation of the crystals, the polarizing directions can be rotated into a suitable direction relative to the orientation of the semiaxes of the elliptical ray by polarization rotators.

Focusing optics can be disposed between the laser and the first crystal and between the individual crystals for increasing the power density of the laser light in the crystals.

If no focusing optics are used the crystals are preferably disposed one close behind the other. The distance can be zero; the crystals are then located directly against one another. As the upper limit for this distance one selects a value of approx. 20% of the Rayleigh length for the wavelength of the primary ray. This permits the crystals to be traversed by approximately plane wave fronts.

The invention is applicable for continuous-wave and pulsed lasers of all types, whereby the nonlinear crystals can be disposed inside or outside the resonator of the laser. The invention can be applied especially advantageously for diode-pumped lasers since it is especially important to optimize the efficiency of frequency multiplication here due to the relatively low output of the laser.

BRIEF DESCRIPTION OF THE DRAWINGS

The invention will be explained with reference to two embodiments and the drawing, in which.

DETAILED DESCRIPTION OF THE PREFERRED EMBODIMENTS

Figure 1:
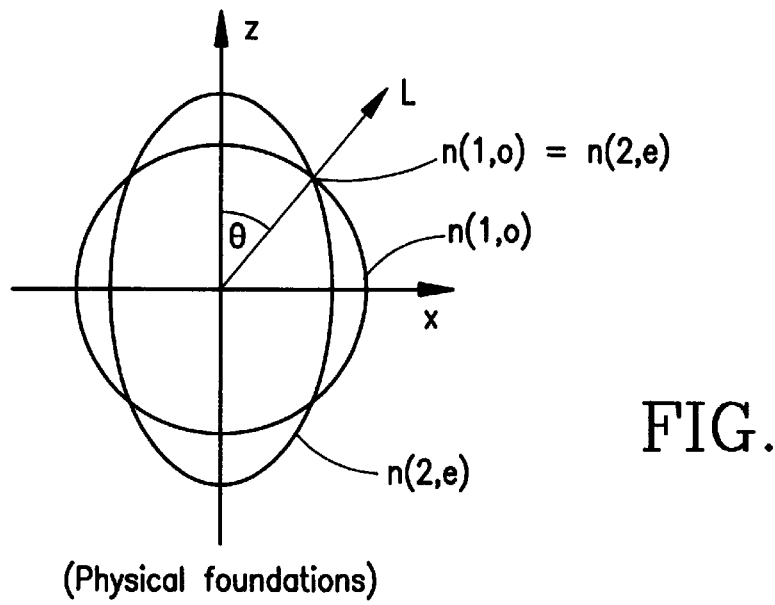
FIG. 1 shows a graphic representation of the refractive indices of ordinary ray and extraordinary ray across the angle of arrival in a crystal (an explanation of FIG. 1 can be found in the description above)
Figure 2:
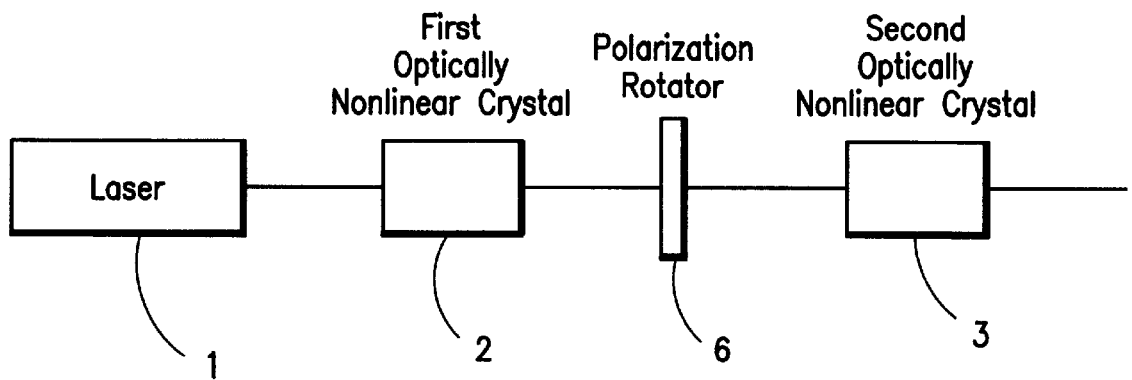
FIG. 2 shows a laser with two optically nonlinear crystals in a schematic representation.

The laser with frequency multiplication shown in FIG. 2 consists of actual laser 1, which for example can be a Nd:YAG laser and emits infrared laser radiation with a wavelength of 1064 nm, and two optically nonlinear crystals 2 and 3.

The laser radiation is guided into first optically non-linear crystal 2 as primary radiation. First optically non-linear crystal 2 serves as a frequency doubler and is a type I crystal which consists for example of potassium niobate. Leaving crystal 2 is light with a fundamental length of 1064 nm (infrared) and frequency-doubled light with a wavelength of 532 nm (green). The ray cross section of the green light is deformed elliptically by the walk-off effect in crystal 2; the cross section of the infrared ray is still circular.

Both rays are guided into second optically nonlinear crystal 3. Crystal 3 serves as a frequency mixer for the infrared and green laser light and provides at its output not only infrared (1064 nm) and green (532 nm) light but also UV light with the triple frequency of the primary radiation (355 nm wavelength). The crystal can be type I or type II. In this example a type II crystal of lithium borate is used.

The length of first optically nonlinear crystal 2, and thus the influence of the walk-off effect on the ray cross section of the green ray, has been selected so that the cross sections of the infrared and green rays overlap optimally in second optically nonlinear crystal 3. The optimum is reached when the sum of the radiation powers of the primary and frequency-multiplied rays is maximal within the overlap area.

Figure 3:
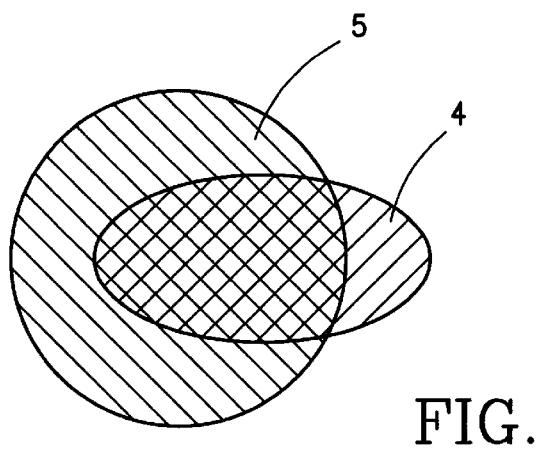
FIG. 3 shows the cross sections of primary and frequency-doubled ray with optimal overlap.

FIG. 3 shows this optimal overlap at which the large semiaxis of elliptically deformed cross section 4 of the green ray is about equal to the diameter of cross section 5 of the infrared ray. Owing to the walk-off effect, cross section 4 is disposed off center from cross section 5.

The arrangement of the plane of principal section of first optically nonlinear crystal 2 relative to that of second optically nonlinear crystal 3 was selected so that the direction of smaller divergence of the green ray is parallel to the direction of small angular acceptance of second optically nonlinear crystal 3. This obtains good phase matching between infrared and green light in crystal 3.

Optically nonlinear crystals require for their functioning certain directions of the planes of polarization of the irradiated light waves relative to each other and to the plane of principal section of the crystal. By rotating first optically nonlinear crystal 2 around the axis in which the laser radiation runs one can align its plane of principal section with the polarizing direction of laser 1. By rotating second optically nonlinear crystal 3 relative to first optically nonlinear crystal 2 one can align its direction of principal section with the polarizing direction of the radiation leaving first nonlinear crystal 2. If the direction of small divergence of the green ray is not parallel to the direction with small angular acceptance of second optically nonlinear crystal 3 in this arrangement, one can use polarization rotator 6 to rotate suitably the polarizing direction of the infrared ray jointly with that of the green ray. The direction with small divergence of the green ray retains its orientation. Such a polarization rotator could be constructed e.g. so as to act as a half-wave plate exploiting the dispersion for infrared and green light.

Optically nonlinear crystals 2 and 3 are disposed relative to each other with their crystal planes in such a way that the walk-off effect of second optically nonlinear crystal 3 acts in the opposite direction to that of first optically nonlinear crystal 2. If the infrared and green rays diverge e.g. upward in the plane of projection in first optically nonlinear crystal 2, they converge downward again in the plane of projection in second optically nonlinear crystal 3. This ray guidance is important for optimal overlap of the rays.

Figure 4:
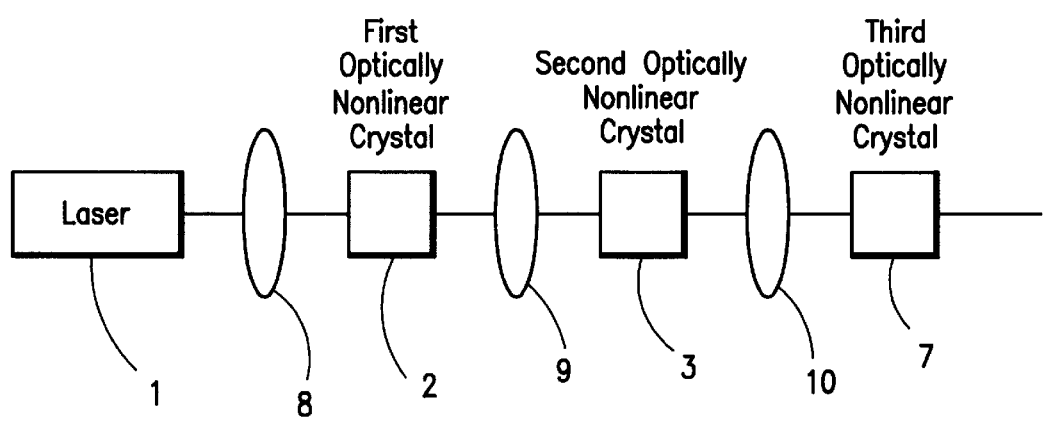
FIG. 4 shows a laser with three optically nonlinear crystals in a schematic representation.

FIG. 4 shows the same setup as FIG. 2, extended by third optically nonlinear crystal 7 and three focusing optics 8, 9, 10 disposed before crystals 2, 3, 7, respectively. No polarization rotator is provided in this example. Third optically nonlinear crystal 7 can also be for example a type II crystal of lithium borate. It mixes the wavelengths 1064 nm and 355 nm irradiated into it and produces UV light with the quadruple frequency of the primary radiation (wavelength 266 nm).

The walk-off effect of second optically nonlinear crystal 3 is coordinated so that the overlap of the primary radiation (1064 nm) and the UV light (355 nm) becomes optimal. The direction of small divergence of the UV ray (355 nm) is placed in the direction of small angular acceptance with respect to phase matching of third optically nonlinear crystal 7.

We claim:

1. A laser with a first optically nonlinear crystal acting as a frequency doubler and at least one further optically nonlinear crystal acting as a frequency multiplier, said first and further optically nonlinear crystals being disposed, beginning with the first optically nonlinear crystal and ending with a last optically nonlinear crystal, in a direction of propagation of laser radiation produced by the laser, wherein said optically nonlinear crystals are disposed relative to one another said direction of propagation in such a way that a plane of a principal section of one crystal includes a direction of small angular acceptance with respect to phase matching of a following crystal, wherein at least said first optically nonlinear crystal has a walk-off angle in the range of from 0.1° to 6° inclusive, and wherein a length of at least said first optically nonlinear crystal is selected so that a length of a large semiaxis of a cross-sectional area of a first frequency-multiplied laser beam is approximately equal to a diameter of a cross-sectional area of a second laser beam to be superimposed with the first.

2. A laser as claimed in claim 1, wherein a number of said further optically nonlinear crystals is at least two, said at least two further optically nonlinear crystals including a second-to-last optically nonlinear crystal, wherein said second-to-last optically nonlinear crystal has a walk-off angle in the range of from 0.1° to 6° inclusive, and wherein a length of said second-to-last of said optically nonlinear crystals is selected so that said length of a large semiaxis of a cross-sectional area of a first frequency-multiplied laser beam is approximately equal to said diameter of a cross-sectional area of a second laser beam to be superimposed with the first.

3. A laser as claimed in claim 1, wherein a number of said further optically nonlinear crystals is greater than two, wherein each of said further optically nonlinear crystals except said last optically nonlinear crystal has a walk-off angle in the range of from 0.1° to 3° inclusive, and wherein lengths of said further optically nonlinear crystals are selected so that said length of a large semiaxis of a cross-sectional area of a first frequency-multiplied laser beam is approximately equal to said diameter of a cross-sectional area of a second laser beam to be superimposed with the first.

4. A laser as claimed in claim 1, wherein at least one polarization rotator is disposed between the optically nonlinear crystals for jointly rotating the polarizing directions of the laser beams to be mixed.

5. A laser as claimed in claim 1, wherein a maximum distance between two successive optically nonlinear crystals is approximately 20% of a Rayleigh length for the wavelength of the laser radiation produced by the laser.

6. A laser as claimed in claim 1, wherein a focusing optic is disposed before at least one of the optically nonlinear crystals in the direction of propagation of the laser radiation produced by the laser.

* * * * *